US011926990B2

(12) United States Patent
Garner et al.

(10) Patent No.: US 11,926,990 B2
(45) Date of Patent: Mar. 12, 2024

(54) HEAVY EQUIPMENT RECOVERY WINCH SYSTEM AND METHODS OF MAKING AND USING SAME

(71) Applicant: Midwestern Manufacturing Company, Tulsa, OK (US)

(72) Inventors: Douglas Edward Garner, Tulsa, OK (US); James Randall Hegwood, Caseyville, IL (US)

(73) Assignee: Midwestern Manufacturing Company, Tulsa, OK (US)

( * ) Notice: Subject to any disclaimer, the term of this patent is extended or adjusted under 35 U.S.C. 154(b) by 0 days.

(21) Appl. No.: 17/141,568

(22) Filed: Jan. 5, 2021

(65) Prior Publication Data

US 2021/0269290 A1 Sep. 2, 2021

Related U.S. Application Data

(60) Provisional application No. 62/982,502, filed on Feb. 27, 2020.

(51) Int. Cl.

*E02F 9/20* (2006.01)
*B66D 1/08* (2006.01)
*B66D 1/38* (2006.01)
*E02F 9/08* (2006.01)
*F15B 15/00* (2006.01)

(52) U.S. Cl.

CPC .............. *E02F 9/2016* (2013.01); *B66D 1/08* (2013.01); *B66D 1/38* (2013.01); *B66D 2700/0191* (2013.01); *E02F 9/0858* (2013.01); *F15B 15/00* (2013.01)

(58) Field of Classification Search

CPC ... B66D 1/08; B66D 1/38; B66D 1/00; B66D 1/36; B66D 1/28; B66D 2700/0191; E02F 3/47; E02F 9/0858; E02F 9/2267; E02F 9/2275; F15B 15/00

See application file for complete search history.

(56) References Cited

U.S. PATENT DOCUMENTS 2,506,242 A * 5/1950 Shoemaker ............. B66C 23/36 414/696
2,997,276 A * 8/1961 Davis ......................... E02F 3/10 37/352
3,027,141 A * 3/1962 Ellis ......................... B66D 1/08 254/323
3,378,158 A * 4/1968 Lopez ....................... E02F 3/47 414/625
3,762,584 A * 10/1973 Peterson .................. B66D 1/36 254/327

(Continued)

OTHER PUBLICATIONS

PCT/US2021/012170; "International Search Report and Written Opinion"; dated Mar. 23, 2021; 16 pages.

*Primary Examiner* — Sang K Kim
*Assistant Examiner* — Nathaniel L Adams
(74) *Attorney, Agent, or Firm* — Hall Estill Law Firm

(57) ABSTRACT

A heavy equipment recovery winch system includes a winch assembly mountable to a drive end of a heavy equipment vehicle, a hydraulic assembly and a fairlead assembly. The hydraulic assembly is mounted to a portion of the heavy equipment vehicle and the hydraulic assembly is operatively connected to the winch assembly. The fairlead assembly is mountable to the drive end of the heavy equipment vehicle to assist with guiding a cable from the winch assembly.

16 Claims, 11 Drawing Sheets

(56) References Cited

U.S. PATENT DOCUMENTS

| | | | | | |
|---|---|---|---|---|---|
| 3,788,605 | A * | 1/1974 | Johnson | B66D 3/006 | 251/166 |
| 3,961,429 | A | 6/1976 | Brown | | |
| 4,650,163 | A * | 3/1987 | Peterson | B66D 1/00 | 254/327 |
| 4,950,125 | A * | 8/1990 | Gravenhorst | E02F 3/47 | 254/379 |
| 5,215,272 | A * | 6/1993 | Sauber | B65H 54/2848 | 242/364 |
| 5,393,194 | A * | 2/1995 | Smith | B66D 1/00 | 280/756 |
| 6,494,437 | B1 * | 12/2002 | Boyer | B66D 1/60 | 254/323 |
| 6,553,694 | B2 * | 4/2003 | Martinez | E02F 9/2016 | 37/403 |
| 8,267,379 | B2 * | 9/2012 | Yang | B66D 3/006 | 254/323 |
| 8,602,394 | B2 * | 12/2013 | Christiansen | B66D 3/006 | 254/323 |
| 8,657,261 | B2 * | 2/2014 | Mehrkens | A63C 11/10 | 254/323 |
| 10,486,578 | B2 * | 11/2019 | Thompson | B66D 1/28 | |
| 2006/0201980 | A1 * | 9/2006 | Koons | B60D 1/075 | 254/323 |
| 2009/0146119 | A1 * | 6/2009 | Bailey | B66D 1/12 | 254/323 |
| 2012/0030974 | A1 * | 2/2012 | Runggaldier | B66D 1/38 | 37/235 |
| 2014/0166953 | A1 * | 6/2014 | Wright | B66D 1/56 | 254/270 |
| 2014/0346419 | A1 | 11/2014 | Muraoka et al. | | |
| 2019/0127190 | A1 * | 5/2019 | Fretz | B66D 1/60 | |

* cited by examiner

HEAVY EQUIPMENT RECOVERY WINCH SYSTEM AND METHODS OF MAKING AND USING SAME

CROSS-REFERENCE TO RELATED APPLICATIONS

This application claims benefit under 35 U.S.C. 119(e) of U.S. Provisional Application Ser. No. 62/982,502, filed Feb. 27, 2020, which is hereby expressly incorporated herein by reference in its entirety.

STATEMENT REGARDING FEDERALLY SPONSORED RESEARCH OR DEVELOPMENT

Not applicable.

FIELD OF THE INVENTION

The present disclosure relates generally to heavy equipment winch systems, and more particularly, not by way of limitation, to an improved heavy equipment recovery winch system.

BRIEF DESCRIPTION OF THE DRAWING(S)

DETAILED DESCRIPTION OF THE INVENTION

Figure 1A:
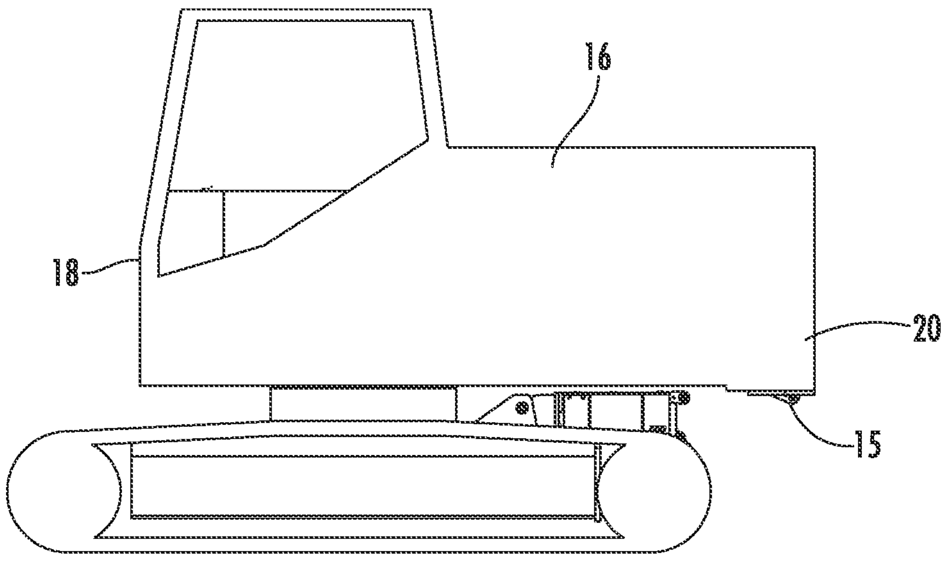
FIG. 1 is (A) a side view, (B) a rear view, (C) a bottom view; (D) an isometric view; and (E) a partial perspective view of a heavy equipment recovery winch system constructed in accordance with the present disclosure, the system shown mounted to a conventional excavator.
Figure 1B:
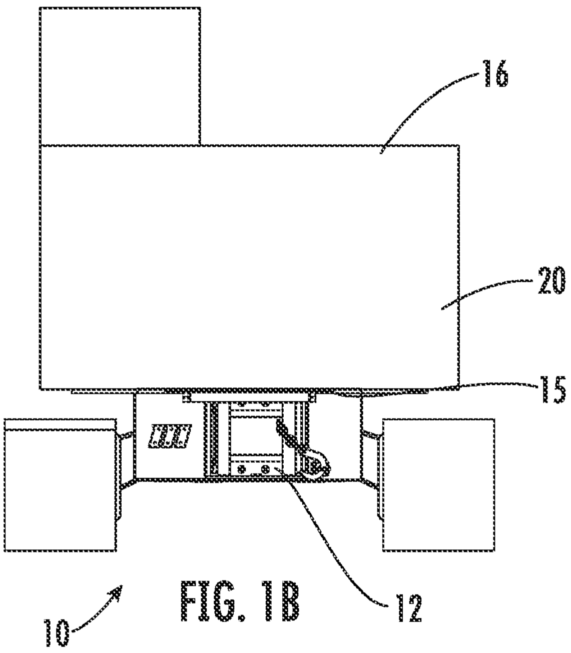
Figure 1C:
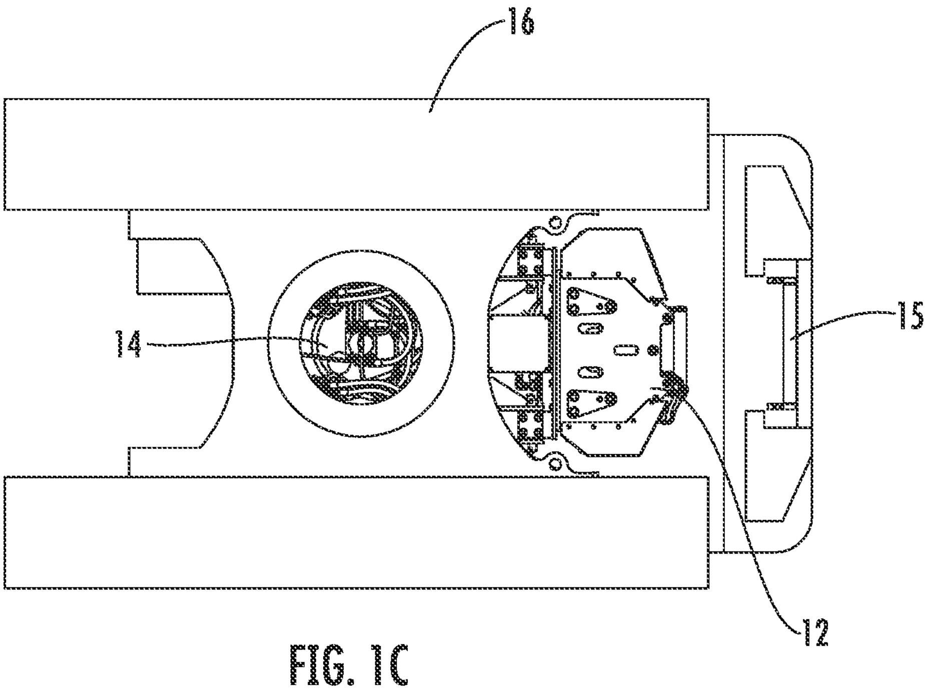
Figure 1D:
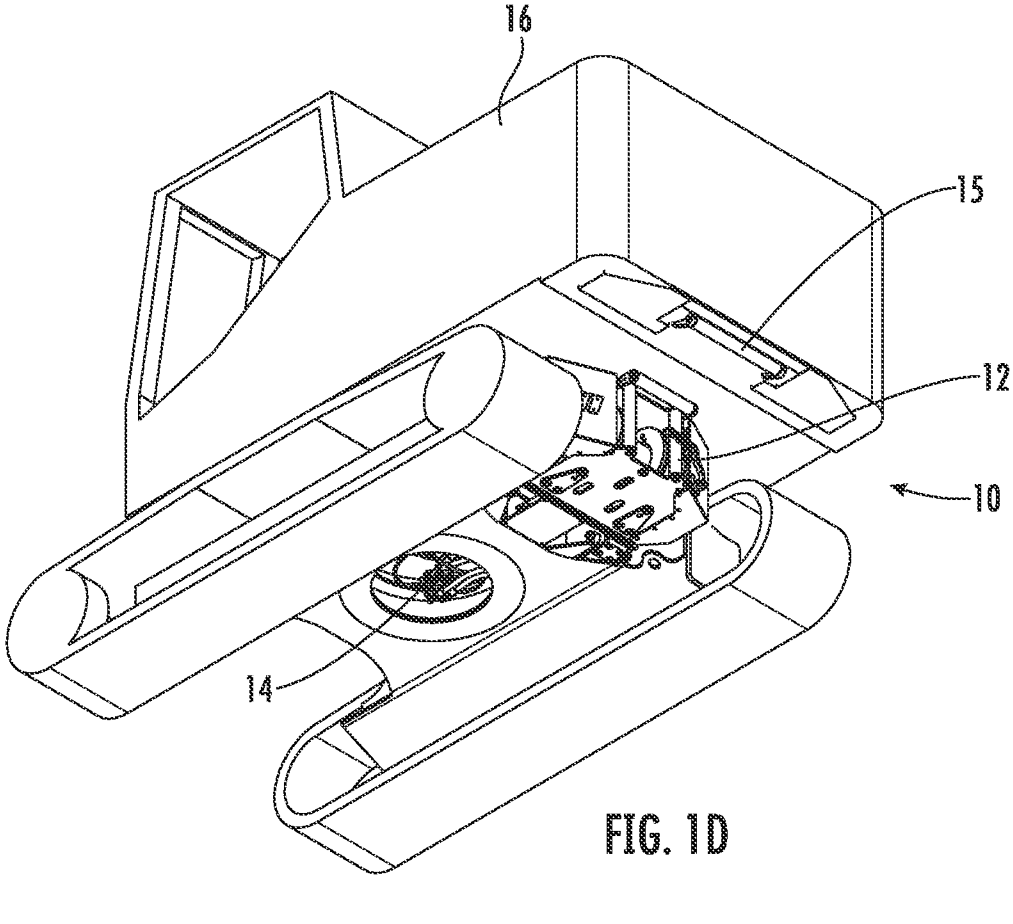
Figure 1E:
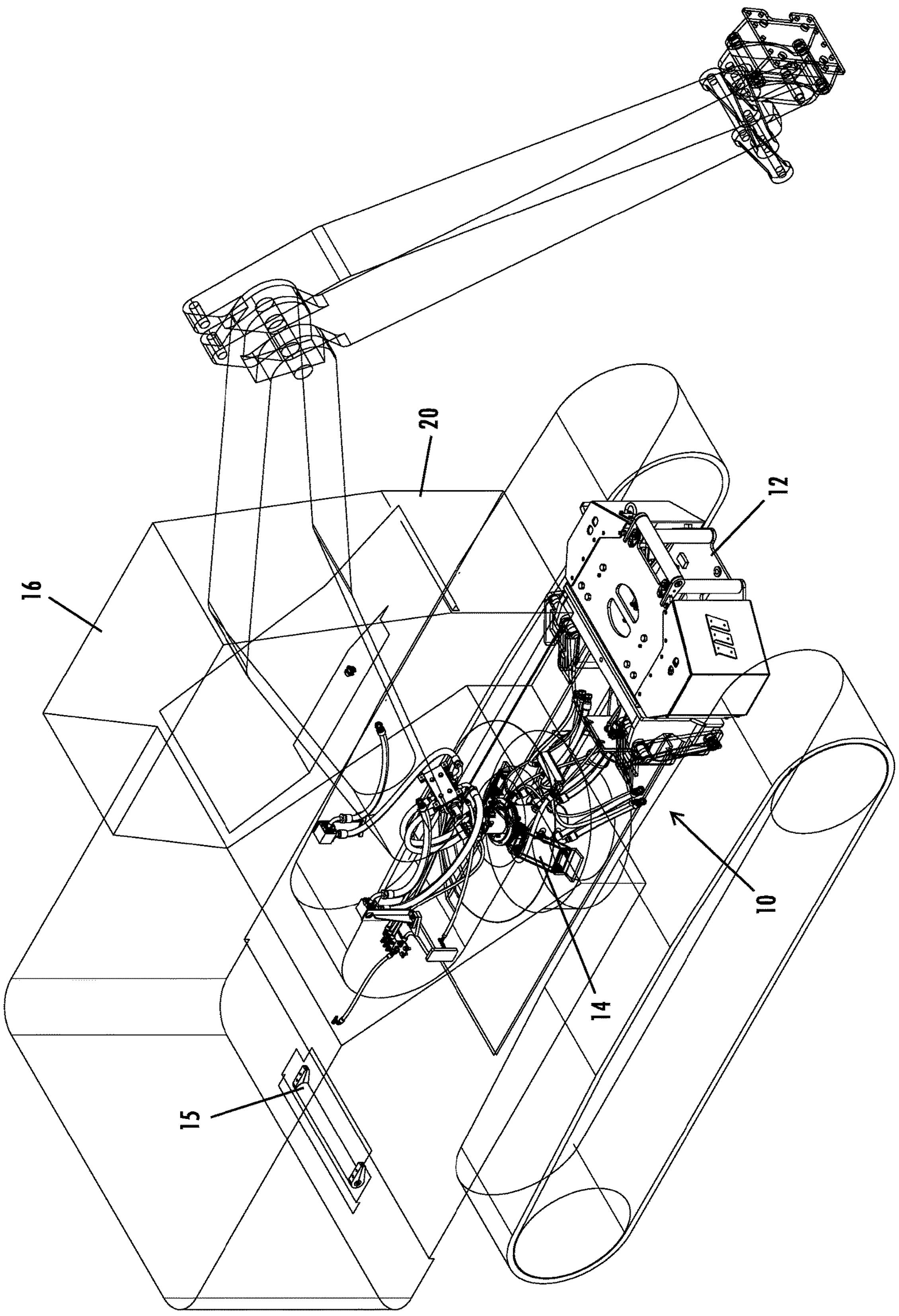
Figure 2:
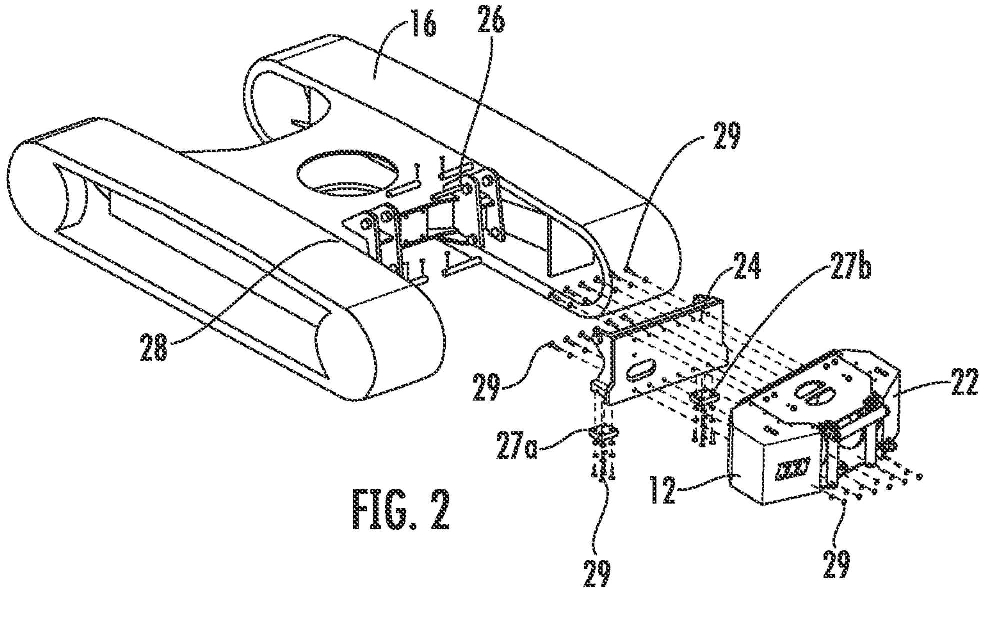
FIG. 2 is an exploded view of a recovery winch assembly of the heavy equipment recovery winch system of FIG. 1.
Figure 3A:
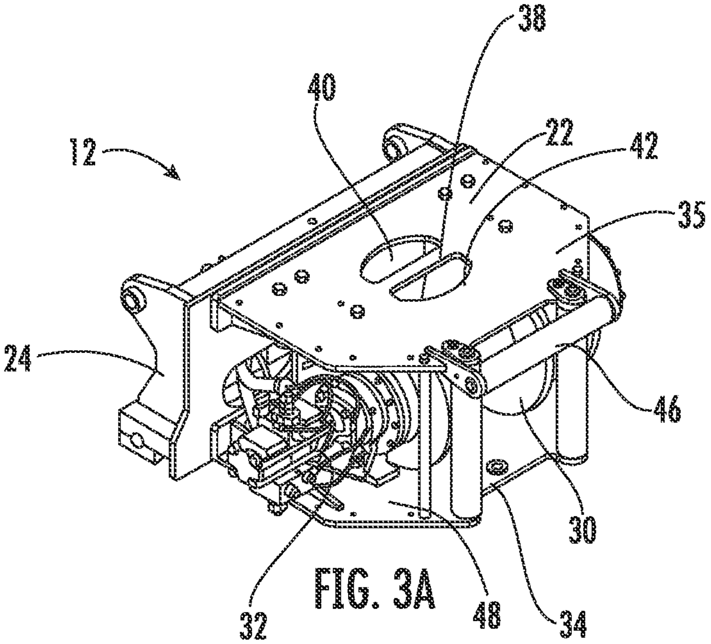
FIG. 3A is a perspective view of one side of the recovery winch assembly of FIG. 1.
Figure 3B:
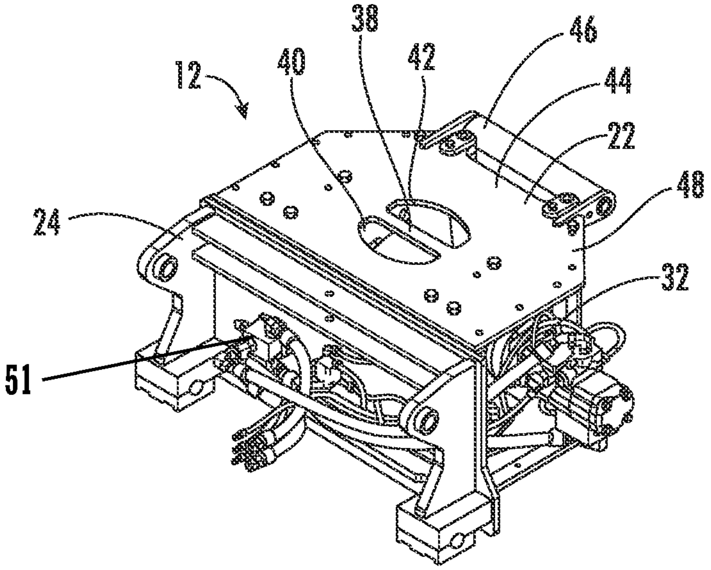
FIG. 3B is a perspective view of a second side of the recovery winch assembly of FIG. 1.
Figure 4A:
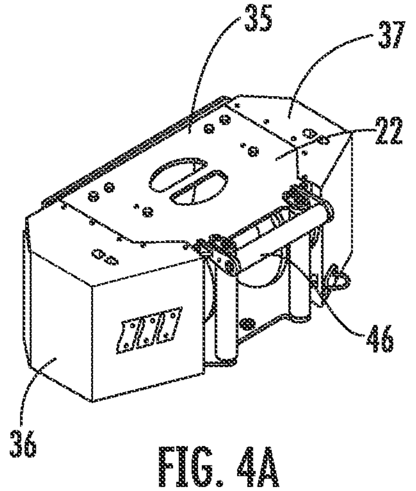
FIG. 4A is a perspective view of the recovery winch assembly of FIG. 1, the winch assembly having a cover.
Figure 4B:
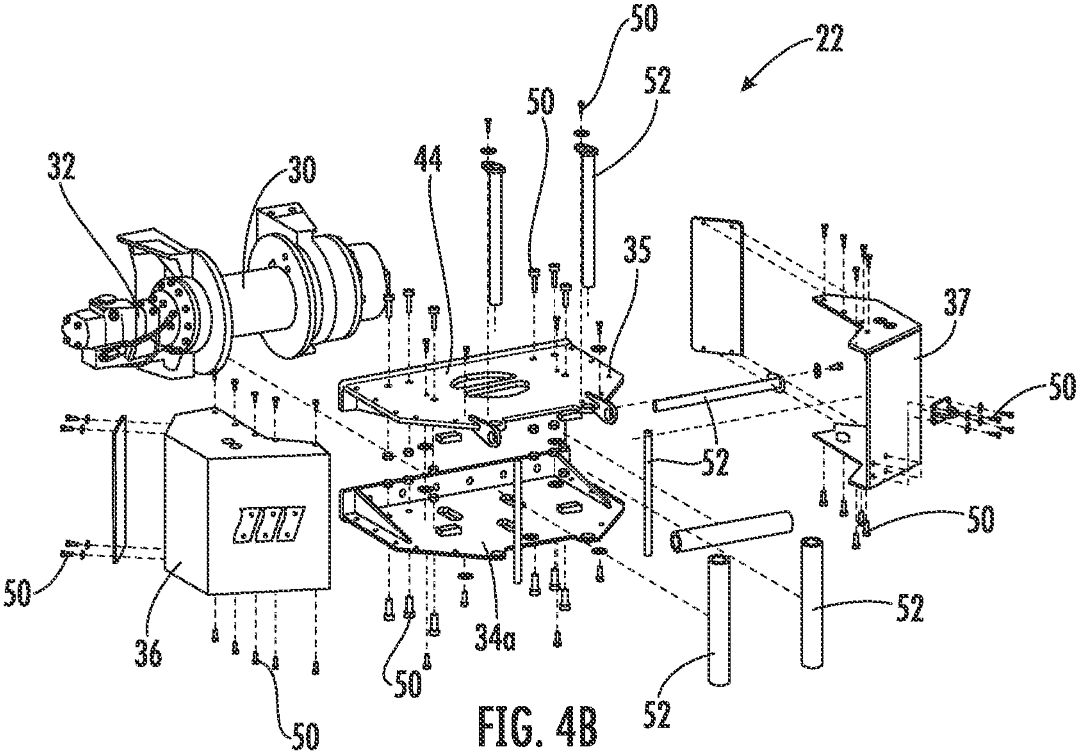
FIG. 4B is an exploded view of the recovery winch assembly of FIG. 1.
Figure 5A:
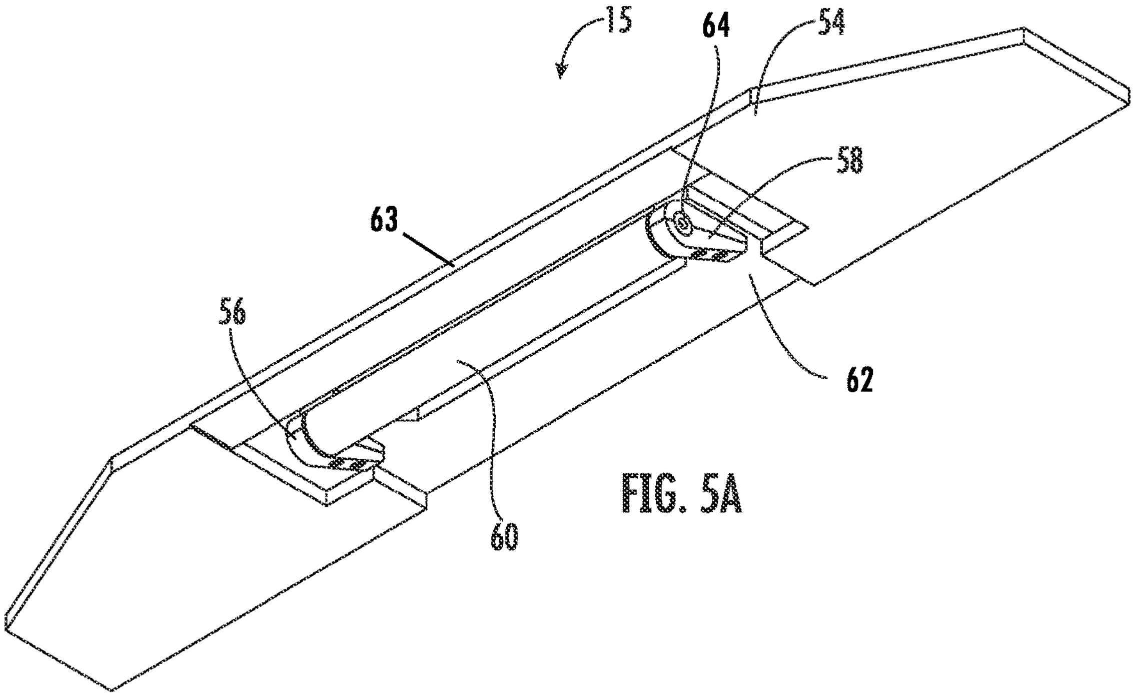
FIG. 5A is a perspective view of a fairlead assembly of FIG. 1.
Figure 5B:
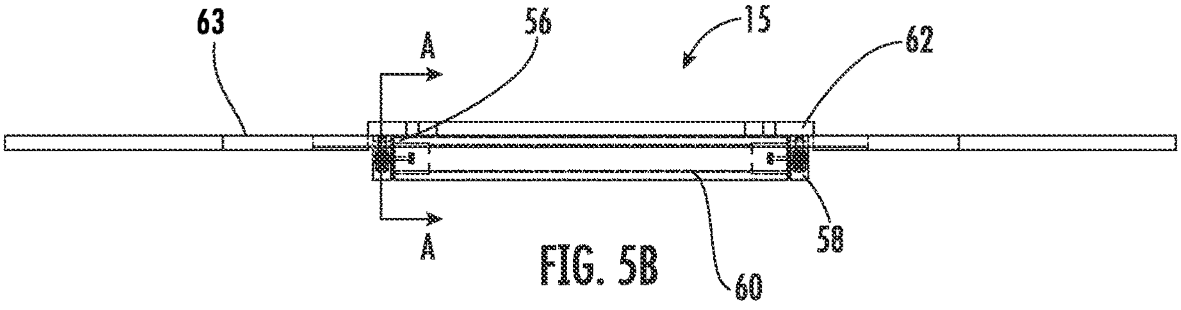
FIG. 5B is a front view of the fairlead assembly of FIG. 1.
Figure 5C:
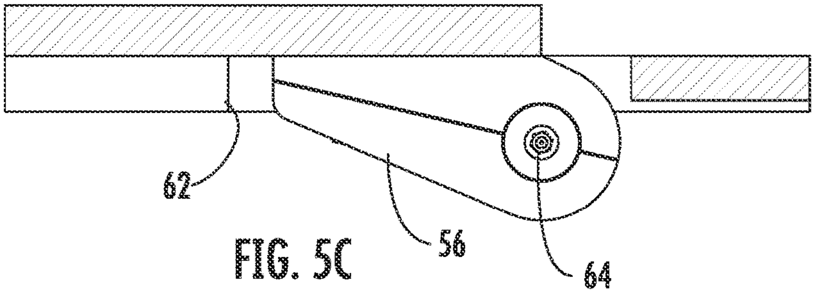
FIG. 5C is a cross-sectional view of the fairlead assembly of FIG. 5B along A-A.
Figure 5D:
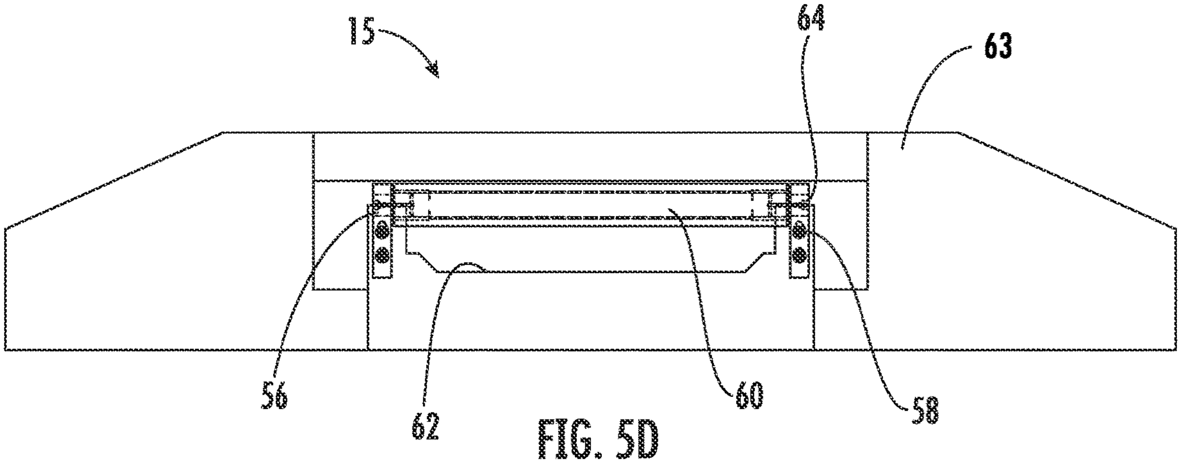
FIG. 5D is a bottom view of the fairlead assembly of FIG. 1.

Before explaining at least one embodiment of the inventive concept disclosed herein in detail, it is to be understood that the inventive concept is not limited in its application to the details of construction, experiments, exemplary data, and/or the arrangement of the components set forth in the following description, or illustrated in the drawings. The presently disclosed and claimed inventive concept is capable of other embodiments or of being practiced or carried out in various ways. Also, it is to be understood that the phraseology and terminology employed herein is for purpose of description only and should not be regarded as limiting in any way.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIGS. 1A-1E, shown therein is one embodiment of a heavy equipment recovery winch system 10 mounted to a conventional excavator 16 having a front end 18 and a drive end 20. Although an excavator 16 is shown herein used with the system 10, it should be understood by one of ordinary skill in the art that any heavy equipment vehicles, such as cranes, crawler vehicles, wheelloaders and/or trucks may be utilized in the system 10 herein so long as the system 10 operates as described herein. The system 10 provides for recovery purposes and for a safe operation of equipment for steep slopes and rough terrain. In various embodiments, the present disclosure is directed to a compact recovery winch package that fits in the limited space below the cab and between the tracks on most excavators.

In one embodiment, the system 10 includes a recovery winch assembly 12, a hydraulic assembly 14 and a fairlead assembly 15. In other embodiments of the system, a fairlead assembly is not necessary. Referring to FIGS. 2-4B, the winch assembly 12 is shown removably connected to the drive end 20 of the excavator 16. The recovery winch assembly 12 includes a winchbox 22, a transition mount assembly 24 and, in some embodiments, a pin up mount assembly 26. The mount assemblies 24 and 26 cooperate to mount the winchbox 22 to the excavator 16. The transition mount assembly 24 includes a pin up design incorporating lower split bosses 27*a* and 27*b* for mounting and demounting the winchbox 22. In one embodiment, the pin up mount assembly 26 is welded to a tractor frame 28 of the excavator 16 so that it may cooperate with the transition mount assembly 24 to mount the winchbox 22 to the excavator 16. A plurality of fasteners 29 are utilized to connect the transition mount assembly 24 to the winchbox 22. It should be understood by one of ordinary skill in the art that any method or apparatus for connecting one object to another may be utilized in the present disclosure.

Referring now to FIGS. 3A-4B, broadly, the winchbox 22 includes a winch 30, mounting plates 34 and 35 and a plurality of covers 36 and 37. The winchbox 22 may be configured to provide a compact, low profile design so as to fit in limited space on various machines. Although it should be understood by one of ordinary skill in the art that the winchbox 22 may be configured in various sizes and methods so long as the winchbox 22 functions in accordance with the present invention as described herein. The winchbox 22 is shown provided with a lifting bar 38 and viewing holes 40 and 42 on a top 44 of the winchbox 22.

The winch 30 may be any variety of winch that is used to pull a load. The winch 30 is operably connected to a brake assembly 32. In one embodiment, the brake assembly 32 is provided with a sprag clutch to assist in the operation of the winch 30 and to prevent fall back. All the planetary gears may be moved to the gear support end to center the drum and it is configured to be mounted horizontally. It should be understood by one of ordinary skill in the art that in other embodiments of the system, any variety of winch systems may be configured so as not to require a sprag clutch so long as the system functions in accordance with the present disclosure. The winch 30 is positioned between the mounting plates 34 and 35 and the covers 36 and 37. In one embodiment, the mounting plates 34 and 35 are designed to replace the factory mounts to create the compact winch package with an integrated fairlead and custom heavy duty covers to protect the winch from damaging debris. The mounting plates 34 and 35 and covers 36 and 37 are connected with a plurality of fasteners 50. Hydraulic valving 51 necessary for the winch assembly 12 is integrated in to the winchbox 22 to protect overpressuring of the winch 30.

An integrated fairlead 46 is provided on a portion 48 of the winchbox 22 so as to assist in guiding a cable from the winch 30. The fairlead 46 is constructed from a plurality of roller assemblies 52 which are operably connected to the winchbox 22. It should be understood by one of ordinary skill in the art that the fairlead may be constructed of same sized or various sized rollers so long as the fairlead operates in accordance with the present disclosure. Further, it should be understood that the fairlead may be connected to the winchbox in any variety of ways of connecting one object to another.

Referring to FIGS. 1A and 5A-5D, the fairlead assembly 15 is mounted under a rear counterweight of the excavator 16. The fairlead assembly 15 is provided with a pair of attachment members 56 and 58 and at least one roller 60. The fairlead assembly 15 is mounted to a portion of the excavator 16. The pair of attachment members 56 and 58 are positioned in a receiving space 62 of a frame 63 of the excavator 16 and are connected to the frame 63 of the excavator 16 on opposing sides. The roller 60 is positioned between the attachment members 56 and 58 and is operably connected to the attachment members 56 and 58 with a pin 64 so as to provide assistance guiding the cable of the winch 30.

Figure 6A:
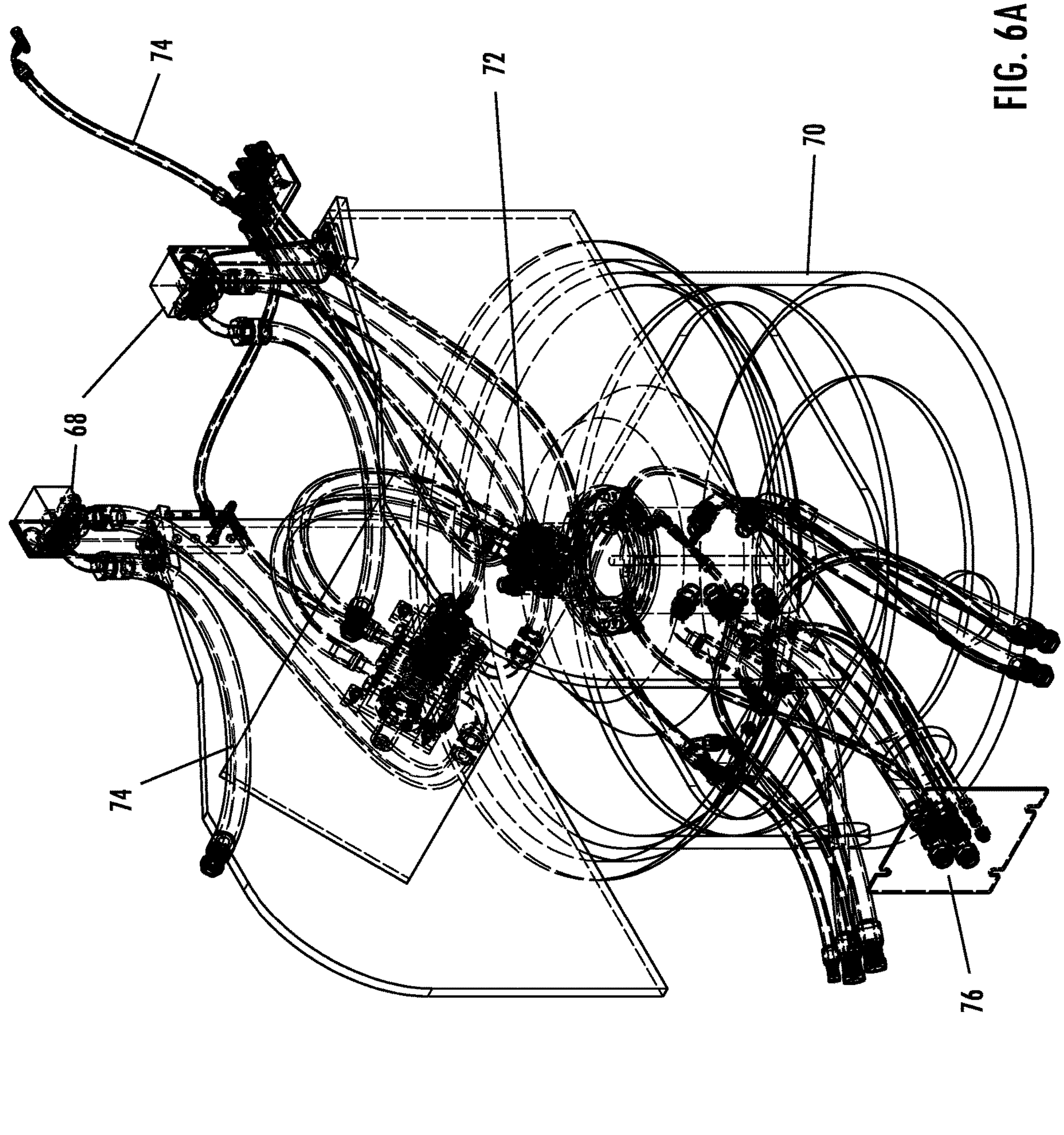
FIG. 6A is a perspective view of an excavator hub having a hydraulic assembly of the heavy equipment recovery winch system of FIG. 1.
Figure 6B:
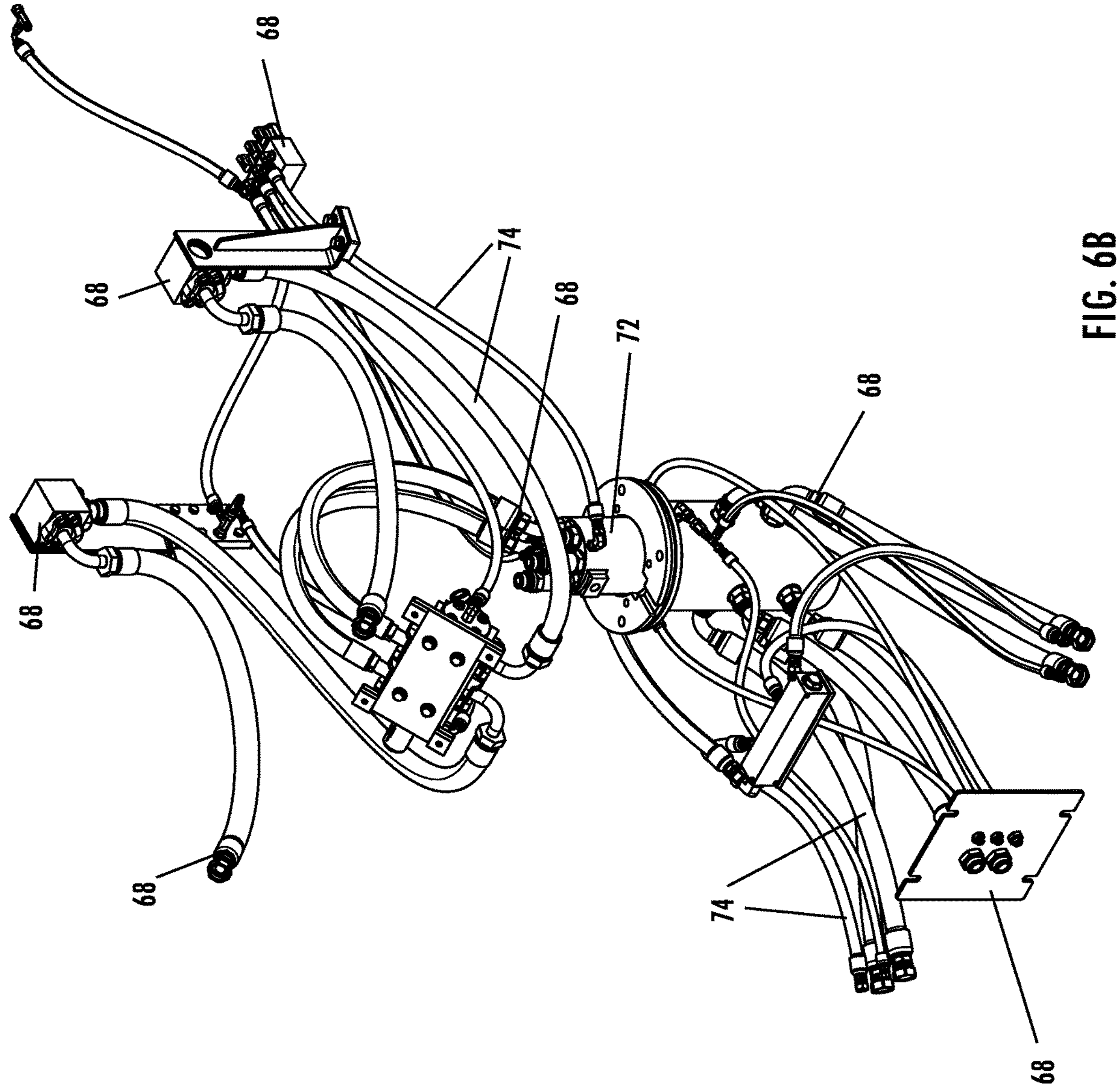
FIG. 6B is a perspective view of the hydraulic assembly of FIG. 6A.

Referring now to FIGS. 6A-6B, the hydraulic assembly 14 is operably connected to the winch assembly 12 and the excavator 16. Broadly, the hydraulic assembly 14 includes a plurality of necessary hydraulic valving 68 integrated in the system 10 on the excavator 16 and a rotary hydraulic swivel 72 positioned in and operably connected to an excavator hub 70 so as to provide the necessary power to the system 10 and the excavator 16. The rotary hydraulic swivel 72 (turning joint) is used to provide the extra ports necessary on the machine to integrate the winch package hydraulically. A plurality of hoses 74 and a plurality of fittings 76 are provided connecting the valving 68 and swivel 72 to all of the necessary parts of the system 10 and the excavator 16, including built-in pressure relief/reducing valves for overpressure and overloading protection. It should be understood by one of ordinary skill in the art that any variety of valving, hoses, fittings and other necessary parts may be utilized herein, so long as the hydraulic assembly functions in accordance with the present disclosure.

Figure 7:
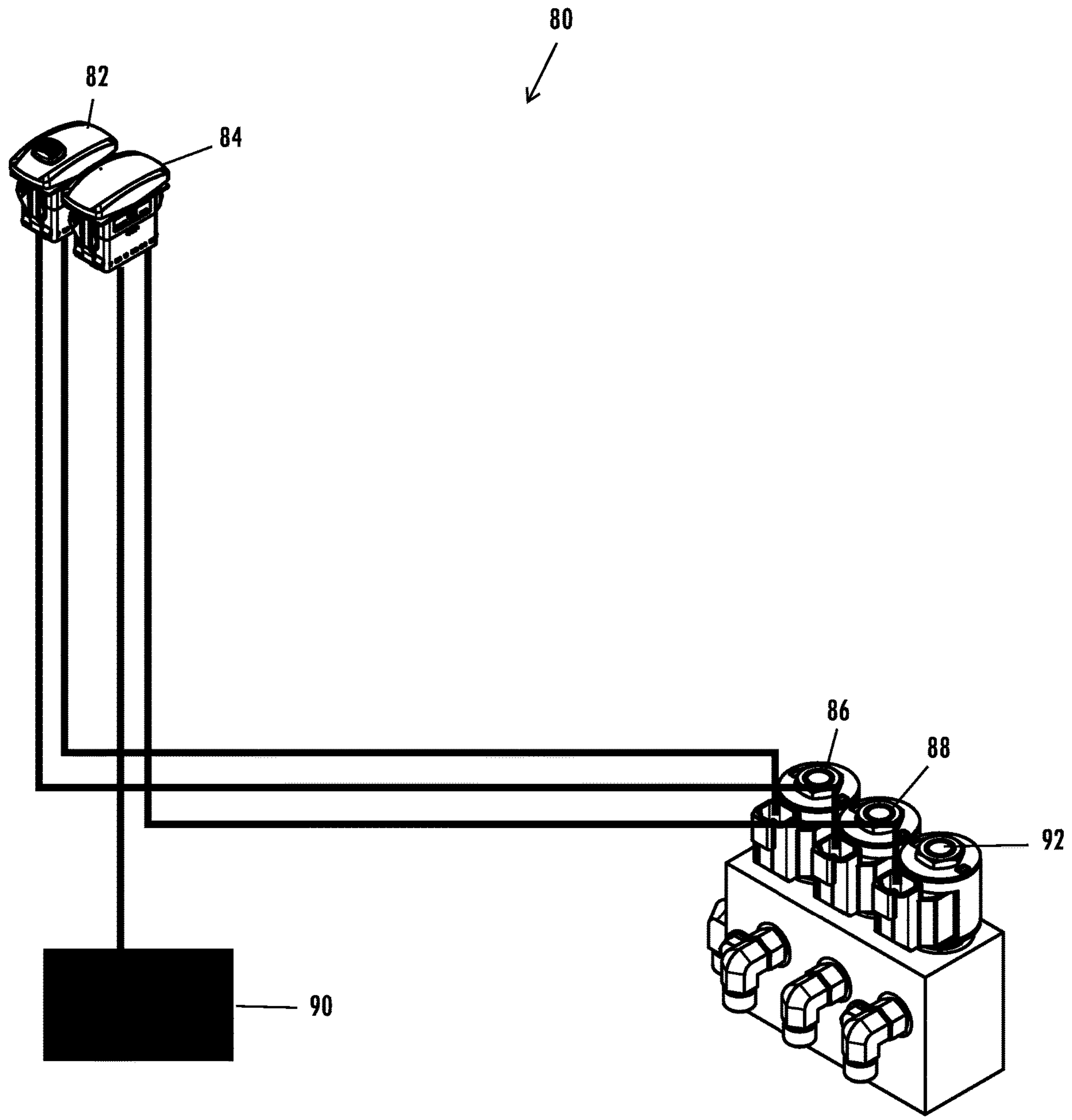
FIG. 7 is a partial perspective view of a switch assembly of the heavy equipment recovery winch system of FIG. 1.

Referring to FIG. 7, shown therein is one embodiment of a switch assembly 80 configured to be integrated into the system 10. The switch assembly 80 includes a locking rocker switch 82 for activating the winch 30 and a two-speed rocker switch 84 for HI/LO operation of the winch 30. The switches are located in a cab of the excavator 16. The switch 82 is operably connectable to a winch selector solenoid 86 and a winch free spool solenoid 88 for operating the winch 30. The switch assembly 80 is connectable to a power source 90. The rocker switch 84 is connectable to a winch two speed solenoid 92 for operating the switch assembly 80. It should be understood by one of ordinary skill in the art that any switch, any number of switches and any variety of configurations may be utilized in the system 10 to operate the winch 30.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. A heavy equipment recovery winch system, comprising:

- a recovery winch assembly mountable to a final drive end of an undercarriage frame of an excavator, the recovery winch assembly, comprising:
  - a first mount assembly connected to the final drive end of the undercarriage frame of the excavator; and
  - a winchbox having a second mount assembly connected to the first mount assembly, a winch having a cable, and an integrated fairlead mounted on a portion of the winchbox so as to guide the cable from the winch wherein the winchbox has a pair of mounting plates such that the winch is positioned between the pair of mounting plates;
- a fairlead assembly mountable to a bottom of an upper frame of the excavator on a counterweight end so as to guide the cable positioned under the excavator and prevent damage to the cable and bottom of the excavator; and
- a hydraulic assembly mounted to a center rotating portion of the excavator and the hydraulic assembly operatively connected to the recovery winch assembly.

2. The system of claim 1, the fairlead assembly, comprising:

- a pair of attachment members connected to the bottom of the upper frame of the excavator on the counterweight end; and
- at least one roller positioned between the pair of attachment members.

3. The system of claim 2 wherein at least one attachment member of the pair of attachment members is positioned within a receiving space on the bottomside of the upper frame of the excavator on the counterweight end.

4. The system of claim 2 wherein the pair of attachments members connect on opposing sides of the bottomside of the upper frame of the excavator on the counterweight end.

5. The system of claim 2 wherein the roller is connected to the pair of attachment members with a pin so as to provide assistance guiding the cable of the winch.

6. A heavy equipment recovery winch system, comprising:

a recovery winch assembly configured so as to be removably mounted to a final drive end of an undercarriage frame of an excavator and operatively connected to a hydraulic assembly of the excavator wherein the recovery winch assembly, comprising:

a winchbox assembly, comprising: a pair of mounting plates, a winch having a cable and a fairlead mounted on a portion of the winchbox assembly so as to guide the cable from the winch wherein the winch is positioned between the pair of mounting plates;

a mount assembly connected to the final drive end of the undercarriage frame of the excavator, the mount assembly having a left mount portion, a right mount portion and a space therebetween for receiving the winchbox assembly of the recovery winch assembly; and a fairlead assembly mounted to a bottom of an upper frame of the excavator on a counterweight end of the excavator so as to guide the cable positioned under the excavator, the fairlead assembly cooperating with the recovery winch assembly to guide the cable from the recovery winch assembly.

7. The system of claim 6 wherein the fairlead is provided integrated to a front of the winchbox.

8. The system of claim 6, the fairlead assembly, comprising:

a pair of attachment members connected to the bottom of the upper frame of the excavator on the counterweight end of the excavator; and at least one roller positioned between the pair of attachment members.

9. The system of claim 8 wherein at least one attachment is positioned on the bottomside of the upper frame of the excavator on the counterweight end.

10. The system of claim 8 wherein the pair of attachments members connected on opposing sides of the bottomside of the upper frame of the excavator on the counterweight end.

11. The system of claim 8 wherein the roller is connected to the pair of attachment members with a pin so as to provide assistance guiding the cable of the winch of the recovery winch assembly.

12. A heavy equipment recovery winch system, comprising:

a mount assembly mounted between tracks on a final drive end of an undercarriage frame of an excavator;

a recovery winch assembly configured to be removably mounted to the mount assembly, the recovery winch assembly, comprising:

a winchbox having a pair of mounting plates, a winch having a cable such that the winch is positioned between the pair of mounting plates and an integrated fairlead mounted on a portion of the winchbox so as to guide the cable from the winch;

a fairlead assembly mountable to a bottom of an upper frame of the excavator on a counterweight end of the excavator so as to guide the cable positioned under the excavator and prevent damage to the cable and bottom of the excavator; and a hydraulic assembly mounted to a center rotating portion of the excavator and the hydraulic assembly operatively connected to the recovery winch assembly.

13. The system of claim 12, the fairlead assembly, comprising:

a pair of attachment members connected to the bottom of the upper frame of the excavator on the counterweight end; and at least one roller positioned between the pair of attachment members.

14. The system of claim 13 wherein at least one attachment member of the pair of attachment members is positioned within a receiving space on the bottomside of the upper frame of the excavator on the counterweight end.

15. The system of claim 13 wherein the pair of attachments members connect on opposing sides of the bottomside of the upper frame of the excavator on the counterweight end.

16. The system of claim 13 wherein the roller is connected to the pair of attachment members with a pin so as to provide assistance guiding the cable of the winch.

* * * * *